(12) United States Patent
Powers et al.

(10) Patent No.: US 7,454,423 B2
(45) Date of Patent: Nov. 18, 2008

(54) ENTERPRISE LINK FOR A SOFTWARE DATABASE

(75) Inventors: Craig R. Powers, San Francisco, CA (US); Kenneth C. Gardner, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 665 days.

(21) Appl. No.: 10/237,559

(22) Filed: Sep. 6, 2002

(65) Prior Publication Data

US 2004/0049477 A1    Mar. 11, 2004

(51) Int. Cl.
  *G06F 17/00* (2006.01)
(52) U.S. Cl. .................. 707/10; 707/101; 707/102; 707/103 X; 707/104.1; 709/223
(58) Field of Classification Search ............... 707/10, 707/101, 102, 1, 100, 2, 3, 203, 103 X, 104.1; 709/232, 200, 203, 224, 231, 246, 220, 223, 709/310, 315; 705/40, 35; 370/351; 726/8
See application file for complete search history.

(56) References Cited

U.S. PATENT DOCUMENTS

| | | | |
|---|---|---|---|
| 5,033,009 A | 7/1991 | Dubnoff | |
| 5,510,980 A | 4/1996 | Peters | |
| 5,553,215 A | 9/1996 | Kaethler | |
| 5,592,608 A | 1/1997 | Weber et al. | |
| 5,613,131 A | 3/1997 | Moss et al. | |
| 5,615,362 A | 3/1997 | Jensen et al. | |
| 5,654,726 A | 8/1997 | Mima et al. | |
| 5,721,847 A | 2/1998 | Johnson | |
| 5,754,774 A | 5/1998 | Bittinger et al. | |
| 5,758,337 A | 5/1998 | Hammond | |
| 5,765,164 A | 6/1998 | Prasad et al. | |
| 5,778,372 A | 7/1998 | Cordell et al. | |
| 5,781,911 A | 7/1998 | Young et al. | |
| 5,784,275 A | 7/1998 | Sojoodi et al. | |
| 5,787,409 A | 7/1998 | Seiffert et al. | |
| 5,809,267 A | 9/1998 | Moran et al. | |
| 5,812,840 A | 9/1998 | Shwartz | |
| 5,831,609 A | 11/1998 | London et al. | |
| 5,831,615 A | 11/1998 | Drews et al. | |

(Continued)

FOREIGN PATENT DOCUMENTS

WO    WO 01/63466 A2    8/2001

OTHER PUBLICATIONS

"Report of Novelty Search", Patentec, dated Apr. 4, 2004.

(Continued)

*Primary Examiner*—Thuy N Pardo
(74) *Attorney, Agent, or Firm*—Townsend and Townsend and Crew LLP

(57) ABSTRACT

An enterprise link for a software database is coupled to existing enterprise systems within an organization and also to an active data cache. The enterprise link contains an active designer whereby a user is able to create one or more data flow definitions on how to operate on data stored in the enterprise systems as the data in those systems changes. The transformed data is transmitted to a data flow service in the enterprise link in real-time where it is made available to end-users in the active data cache.

19 Claims, 7 Drawing Sheets

U.S. PATENT DOCUMENTS

| | | |
|---|---|---|
| 5,857,201 A | 1/1999 | Wright, Jr. et al. |
| 5,862,325 A | 1/1999 | Reed et al. |
| 5,864,669 A | 1/1999 | Osterman et al. |
| 5,890,174 A | 3/1999 | Khanna et al. |
| 5,893,126 A | 4/1999 | Drews et al. |
| 5,898,434 A | 4/1999 | Small et al. |
| 5,918,009 A | 6/1999 | Gehani et al. |
| 5,922,044 A | 7/1999 | Banthia |
| 5,926,177 A | 7/1999 | Hatanaka et al. |
| 5,928,327 A | 7/1999 | Wang et al. |
| 5,930,794 A | 7/1999 | Linenbach et al. |
| 5,943,620 A | 8/1999 | Boltz et al. |
| 5,974,236 A | 10/1999 | Sherman |
| 6,023,694 A | 2/2000 | Kouchi et al. |
| 6,025,844 A | 2/2000 | Parsons |
| 6,035,324 A | 3/2000 | Chang et al. |
| 6,038,558 A | 3/2000 | Powers et al. |
| 6,055,548 A | 4/2000 | Comer et al. |
| 6,070,197 A | 5/2000 | Cobb et al. |
| 6,073,242 A | 6/2000 | Hardy et al. |
| 6,075,530 A | 6/2000 | Lucas et al. |
| 6,088,481 A | 7/2000 | Okamoto et al. |
| 6,092,102 A | 7/2000 | Wagner |
| 6,094,681 A | 7/2000 | Shaffer et al. |
| 6,112,236 A | 8/2000 | Dollin et al. |
| 6,141,659 A | 10/2000 | Barker et al. |
| 6,170,019 B1 | 1/2001 | Dresel et al. |
| 6,175,859 B1 | 1/2001 | Mohler |
| 6,182,116 B1 | 1/2001 | Namma et al. |
| 6,185,582 B1 | 2/2001 | Zellweger et al. |
| 6,189,069 B1 * | 2/2001 | Parkes et al. ............... 711/100 |
| 6,201,539 B1 | 3/2001 | Miller et al. |
| 6,204,846 B1 | 3/2001 | Little et al. |
| 6,205,474 B1 | 3/2001 | Hurley |
| 6,208,990 B1 | 3/2001 | Suresh et al. |
| 6,233,578 B1 | 5/2001 | Machihara et al. |
| 6,239,797 B1 | 5/2001 | Hills et al. |
| 6,240,444 B1 | 5/2001 | Fin et al. |
| 6,243,698 B1 * | 6/2001 | Powers et al. ................. 707/2 |
| 6,243,713 B1 | 6/2001 | Nelson et al. |
| 6,256,649 B1 | 7/2001 | Mackinlay et al. |
| 6,256,676 B1 * | 7/2001 | Taylor et al. ................ 709/246 |
| 6,269,393 B1 | 7/2001 | Yost et al. |
| 6,292,803 B1 | 9/2001 | Richardson et al. |
| 6,301,601 B1 | 10/2001 | Helland et al. |
| 6,304,546 B1 | 10/2001 | Natarajan et al. |
| 6,314,463 B1 | 11/2001 | Abbott et al. |
| 6,317,737 B1 | 11/2001 | Gorelik et al. |
| 6,336,135 B1 | 1/2002 | Niblett et al. |
| 6,341,312 B1 | 1/2002 | French et al. |
| 6,348,933 B1 | 2/2002 | Walls et al. |
| 6,363,363 B1 * | 3/2002 | Haller et al. ................... 705/40 |
| 6,393,421 B1 | 5/2002 | Paglin |
| 6,397,217 B1 | 5/2002 | Melbin |
| 6,430,576 B1 | 8/2002 | Gates et al. |
| 6,449,344 B1 | 9/2002 | Goldfinger ............... 379/88.17 |
| 6,467,052 B1 | 10/2002 | Kaler et al. |
| 6,480,847 B1 | 11/2002 | Linenbach et al. |
| 6,510,457 B1 | 1/2003 | Ayukawa et al. |
| 6,513,047 B1 | 1/2003 | Talley |
| 6,519,568 B1 | 2/2003 | Harvey et al. |
| 6,523,046 B2 | 2/2003 | Liu et al. |
| 6,532,465 B2 | 3/2003 | Hartley et al. |
| 6,535,227 B1 | 3/2003 | Fox et al. |
| 6,542,165 B1 | 4/2003 | Ohkado |
| 6,567,796 B1 | 5/2003 | Yost et al. |
| 6,567,814 B1 * | 5/2003 | Bankier et al. .............. 707/101 |
| 6,574,618 B2 | 6/2003 | Eylon et al. |
| 6,574,639 B2 | 6/2003 | Carey et al. |
| 6,591,277 B2 | 7/2003 | Spence et al. |
| 6,591,278 B1 | 7/2003 | Ernst |
| 6,598,167 B2 * | 7/2003 | Devine et al. ................... 726/8 |
| 6,606,596 B1 | 8/2003 | Zirngibl et al. |
| 6,640,234 B1 | 10/2003 | Coffen et al. |
| 6,647,272 B1 | 11/2003 | Asikainen |
| 6,651,055 B1 | 11/2003 | Kilmer et al. |
| 6,651,142 B1 | 11/2003 | Gorelik et al. |
| 6,701,485 B1 | 3/2004 | Igra et al. |
| 6,731,314 B1 | 5/2004 | Cheng et al. |
| 6,745,193 B1 | 6/2004 | Horvitz et al. |
| 6,775,267 B1 | 8/2004 | Kung et al. |
| 6,789,083 B2 | 9/2004 | Thelen |
| 6,832,341 B1 | 12/2004 | Vijayan |
| 6,901,592 B2 | 5/2005 | Mar et al. |
| 6,907,422 B1 | 6/2005 | Predovic |
| 6,915,457 B1 | 7/2005 | Miller |
| 6,920,607 B1 | 7/2005 | Ali et al. |
| 6,938,221 B2 | 8/2005 | Nguyen |
| 6,954,757 B2 | 10/2005 | Zargham et al. |
| 6,954,902 B2 | 10/2005 | Noma et al. |
| 6,996,768 B1 | 2/2006 | Elo et al. |
| 7,024,474 B2 | 4/2006 | Clubb et al. |
| 7,031,314 B2 | 4/2006 | Craig et al. |
| 7,032,006 B2 | 4/2006 | Zhuk |
| 7,058,953 B2 | 6/2006 | Willard et al. |
| 7,096,432 B2 | 8/2006 | Huapaya et al. |
| 7,113,964 B1 | 9/2006 | Bequet et al. |
| 7,120,139 B1 | 10/2006 | Kung et al. |
| 7,171,473 B1 | 1/2007 | Eftis et al. |
| 7,174,339 B1 | 2/2007 | Wucherer et al. |
| 7,197,565 B2 | 3/2007 | Abdelaziz et al. |
| 7,243,124 B1 | 7/2007 | Gardner et al. |
| 7,272,660 B1 | 9/2007 | Powers et al. |
| 2001/0034733 A1 * | 10/2001 | Prompt et al. ............... 707/102 |
| 2001/0039616 A1 | 11/2001 | Kumagai et al. |
| 2001/0049721 A1 | 12/2001 | Blair et al. |
| 2002/0013853 A1 * | 1/2002 | Baber et al. ................. 709/232 |
| 2002/0038217 A1 | 3/2002 | Young |
| 2002/0057678 A1 | 5/2002 | Jiang et al. |
| 2002/0059472 A1 | 5/2002 | Wollrath et al. |
| 2002/0065894 A1 | 5/2002 | Dalal et al. |
| 2002/0078208 A1 | 6/2002 | Crump et al. |
| 2002/0083067 A1 * | 6/2002 | Tamayo et al. .............. 707/100 |
| 2002/0083118 A1 * | 6/2002 | Sim ........................... 709/105 |
| 2002/0107864 A1 * | 8/2002 | Battas et al. ................. 707/101 |
| 2002/0107905 A1 | 8/2002 | Roe et al. |
| 2002/0107957 A1 * | 8/2002 | Zargham et al. ............. 709/224 |
| 2002/0116362 A1 * | 8/2002 | Li et al. ........................ 707/1 |
| 2002/0120697 A1 | 8/2002 | Generous et al. |
| 2002/0120765 A1 * | 8/2002 | Boehmke ................... 709/231 |
| 2002/0143710 A1 | 10/2002 | Liu |
| 2002/0152402 A1 | 10/2002 | Tov et al. |
| 2002/0165849 A1 | 11/2002 | Singh et al. |
| 2002/0184187 A1 | 12/2002 | Bakalash et al. |
| 2002/0198985 A1 | 12/2002 | Fraenkel et al. |
| 2003/0004742 A1 | 1/2003 | Palmer et al. |
| 2003/0023691 A1 | 1/2003 | Knauerhase |
| 2003/0028682 A1 * | 2/2003 | Sutherland ................... 709/315 |
| 2003/0028683 A1 * | 2/2003 | Yorke et al. ................. 709/315 |
| 2003/0033329 A1 | 2/2003 | Bergman et al. |
| 2003/0074393 A1 | 4/2003 | Peart |
| 2003/0088633 A1 | 5/2003 | Chiu et al. |
| 2003/0093585 A1 | 5/2003 | Allan |
| 2003/0101201 A1 | 5/2003 | Saylor et al. |
| 2003/0101223 A1 | 5/2003 | Pace et al. |
| 2003/0105837 A1 * | 6/2003 | Kamen et al. ............... 709/220 |
| 2003/0115186 A1 * | 6/2003 | Wilkinson et al. ............. 707/3 |
| 2003/0120805 A1 | 6/2003 | Couts et al. |
| 2003/0126136 A1 * | 7/2003 | Omoigui ...................... 707/10 |
| 2003/0154177 A1 * | 8/2003 | Holland et al. ................ 706/60 |
| 2003/0182428 A1 | 9/2003 | Li et al. |
| 2003/0182461 A1 * | 9/2003 | Stelting et al. .............. 709/310 |
| 2003/0187971 A1 * | 10/2003 | Uliano et al. ................ 709/223 |
| 2003/0204741 A1 | 10/2003 | Schoen et al. |

| | | | |
|---|---|---|---|
| 2003/0208543 | A1 | 11/2003 | Enete et al. |
| 2003/0217081 | A1* | 11/2003 | White et al. ................. 707/203 |
| 2003/0220860 | A1* | 11/2003 | Heytens et al. ................. 705/35 |
| 2003/0225811 | A1* | 12/2003 | Ali et al. ..................... 709/101 |
| 2003/0229722 | A1 | 12/2003 | Beyda |
| 2003/0235279 | A1 | 12/2003 | Richomme |
| 2004/0002958 | A1 | 1/2004 | Seshadri et al. |
| 2004/0010543 | A1* | 1/2004 | Grobman ..................... 709/203 |
| 2004/0030762 | A1 | 2/2004 | Silverthorne et al. |
| 2004/0039776 | A1 | 2/2004 | Ballard |
| 2004/0039800 | A1 | 2/2004 | Black et al. |
| 2004/0054802 | A1 | 3/2004 | Beauchamp et al. |
| 2004/0073596 | A1* | 4/2004 | Kloninger et al. ........... 709/200 |
| 2004/0087300 | A1 | 5/2004 | Lewis |
| 2004/0146044 | A1* | 7/2004 | Herkerdorf et al. ......... 370/351 |
| 2004/0152477 | A1 | 8/2004 | Wu et al. |
| 2004/0254998 | A1 | 12/2004 | Horvitz |
| 2005/0004984 | A1 | 1/2005 | Simpson |
| 2005/0055329 | A1* | 3/2005 | Bakalash et al. ................. 707/1 |
| 2005/0086211 | A1 | 4/2005 | Mayer |
| 2005/0102294 | A1* | 5/2005 | Coldewey ................... 707/100 |
| 2005/0102611 | A1 | 5/2005 | Chen |
| 2006/0089939 | A1 | 4/2006 | Broda et al. |
| 2006/0161540 | A1 | 7/2006 | Schmitz et al. |
| 2008/0043256 | A1 | 2/2008 | Broda et al. |
| 2008/0046505 | A1 | 2/2008 | Netsch et al. |
| 2008/0046506 | A1 | 2/2008 | Broda |
| 2008/0046510 | A1 | 2/2008 | Beauchamp et al. |
| 2008/0046536 | A1 | 2/2008 | Broda |
| 2008/0046556 | A1 | 2/2008 | Nicholls et al. |
| 2008/0046568 | A1 | 2/2008 | Broda et al. |
| 2008/0046803 | A1 | 2/2008 | Beauchamp et al. |
| 2008/0046837 | A1 | 2/2008 | Beauchamp et al. |
| 2008/0077656 | A1 | 3/2008 | Broda |
| 2008/0148289 | A1 | 6/2008 | Nicholls et al. |
| 2008/0155020 | A1 | 6/2008 | Beauchamp et al. |

OTHER PUBLICATIONS

"Steel-Belted Radius/Enterprise Edition", Funk Software, Inc., 2004.
"Jabber: About: Technology Overview", Jabber Software Foundation, Dec. 12, 2003.
Jan Smith, "Browser Basics: Printing", Feb. 3, 2003.
Perfetti, Christine and Jared M. Spool, "Macromedia Flash: A New Hope for Web Applications", User Interface Engineering, 2002.
Aaron Weiss, "The Document Object Model Dissected", Jupitermedia Corporation, 2002.
"Protecting the Enterprise from Rogue Protocols", Akonix Systems, Inc., 2002.
"Informatica Applications: Leverage your Enterprise Information for Better Decision Making", Informatica Corporation, 2002.
"Informatica Applications: Informatica Customer Relationship Analytics", Informatica Corporation, 2002.
"Brocade Rapidly Implements Customer and Sales Analytics", Informatica Corporation, 2002.
Howlett, Dennis and Keith Rodgers, "Delivering Value Back to the Business: A Guide to Successful Portal Selection and Implementation", Tibco Software, 2002.
"Sametime for iSeries 2.5", Lotus Software, IBM Corporation, 2002.
"Business Intelligence Software: Engendering a Quiet Revolution in the Business Place", MicroStrategy, Dec. 20, 2002.
Bob Woods, "CypherGuard Secures MSN, Windows IM", Instant Messaging Planet, JupiterMedia Corporation, Oct. 3, 2002.
"Business Transformation Through End-to-End Integration", IBM, Aug. 2002.
"The Sagent Analytic Advantage", Sagent Technology Inc., May 2002.
Hugh J. Watson, "Recent Developments in Data Warehousing", Communications of the Association for Information Systems, vol. 8, 2001.
"The Business Intelligence Industry's Leading Products and Services", Business Objects, 2001.
Stephen Brewster, "Windowing Systems", Glasgow Interactive Systems Group, 2001.
"Express Communicator", White Paper, ACD Systems Ltd., May 2001.
"Business Rules: Powering Business and E-Business", White Paper, ILOG, May 2001.
"Data Warehousing Tutorial", Paretoanalysts, Dec. 27, 2001.
"The Sagent Performance Story", Sagent Technology, Inc., Oct. 2001.
"Achieving Global Business Visibility with the webMethods Integration Platform", webMethods, Inc., Sep. 2001.
Bernstein, Philip A. and Erhard Rahm, "Data Warehouse Scenarios for Model Management", Microsoft Corporation, 2000.
"Implementing the RosettaNet eBusiness Standard: Automating High-tech Supply Chains using BusinessWare for RosettaNet", Vitria Technology Inc., 2000.
Wang, Wenjie and Jiaying Pan, "Instant Messaging Insight", Computer Science Department, New York University, Nov. 22, 2000.
"X Window System: Getting Started", Stanford University, Oct. 26, 2000.
Mark Day et al., "A Model for Presence and Instant Messaging", Network Working Group, Request for Comments 2778, The Internet Society, Feb. 2000.
"The Basics of Browser", Santa Clara County Office of Education Internet Institute (SCCOE), 1999.
Randy Corke, "Keeping Data Warehouses Current: Automating Incremental Updates With Data Movement", DM Direct, May 1999.
Moran, Brian and Russ Whitney, "Getting to Know OLAP and MDX", Windows IT Pro, Instant Doc. #5112, Apr. 1999.
Mark Handley et al., "SIP: Session Initiation Protocol", Network Working Group, Request for Comments 2543, The Internet Society, Mar. 1999.
"MQSeries link for R/3", International Business Machines Corporation, 1998.
Michael Tsai, "The Personal Computing Paradigm", ATPM Inc., 1998.
Arno Schoedl, "Issues for Implementing User Interface Software", Georgia Institute of Technology, Sep. 26, 1998.
Allan Christian Long et al., "PDA and Gesture Use in Practice: Insights for Designers of Pen-based User Interfaces", University of California at Berkeley, 1997.
"Middleware—The Essential Component for Enterprise Client/Server Applications", International Systems Group, Inc., Feb. 1997.
Nicolas Pioch, "A Short IRC Primer", Jan. 1, 1997.
Constantine Stephanidis et al., "Design Representations and Development Support for User Interface Adaptation", Institute of Computer Science Foundation for Research and Technology, 1995.
"An Introduction to Messaging and Queuing", IBM Corp, Jun. 1995.
"Relational OLAP: An Enterprise-Wide Data Delivery Architecture", MicroStrategy, Incorporated, 1994.
"Guidelines for Implementing and Using the NBS Data", Federal Information Processing Standards, Publication 74, Apr. 1, 1981.
"ILOG Views 2D Graphics: The C++ Library for Interactive 2D Graphics", ILOG.
"Sametime 3 Features and Benefits", IBM.
"Scripting Support for Web Page Printing Sample," Microsoft Corporation, 2004.
"Print Without Pop Up Window Using Javascript," Experts Exchange, posted Nov. 3, 2002.
"Adding Printer Capabilities," Interactivetools.Com, posted Oct. 19, 2002.
Thomas Loo and Martin Honnen, "How Can I Print a Document That is not Currently Loaded Into a Frame or Window," Synop Software, Apr. 24, 2002.
Jake Howlett, "Further Control of Printing," Codestore, Jan. 3, 2002.
Steve Cimino, "How Can I Print a Web Page in ASP?", Internet.Com Corp., posted Jul. 27, 2001.
"JavaScript: MSIE 5 Unable to Print Child Window," Experts Exchange, posted Jun. 7, 2000.
Andrew Nosenko, "Scripting Support for Web Page Printing," Microsoft Corporation, Mar. 28, 2000.

Dabke, P., "Enterprise Integration Via Corba-Based Information Agents," IEEE Internet Computing, Sep./Oct. 1999, pp. 49-57, vol. 3, Issue 5.

Goldsmith, D. et al., "UTF-7: A Mail-Safe Transformation Format of Unicode," Network Working Group, Request for Comments: 2152, Obsoletes: RFC 1642, Category: Informational, May 1997, pp. 1-15.

Gwinn, A., "Simple Network Paging Protocol—Version 3—Two-Way Enhanced," Network Working Group, Request For Comments: 1851, Obsoletes: 1645, Category: Informational Oct. 1995, pp. 1-23.

Halberg, B., Using Microsoft Excel 97, Bestseller Edition, 1997, pp. 19, 55, 81, 87, 107, 144, 159, 167, 177, 268, 269, 271, 275, 287, 417, 419, 431 and 638, QUE Corporation.

Karn, P. et al., "The ESP Triple DES Transform," Network Working Group, Request For Comments: 1851, Category: Experimental, Sep. 1995, pp. 1-11.

Microsoft Excel 2000, published by Microsoft in 1999, screen captures, 12 pages.

Microsoft Excel Print Screen Images (figs. 1-6), 6 pages.

Movva, R. et al., "MSN Messenger Service 1.0 Protocol," Instant Messaging and Presence Protocol, Internet Draft, Category: Informational, Document: draft-movva-msn-messenger-protocol-00.txt, Aug. 1999, pp. 1-19.

Oikarinen, J. et al., "Internet Relay Chat Protocol," Network Working Group, request for Comments: 1459, May 1993, pp. 1-58.

Richardson, T. et al., "The RFB Protocol," Jan. 1998(revised Jul. 16, 1998), pp. 1-26, Version 3.3, ORL, Cambridge.

Ünal, A., "Electronic Commerce and Multi-enterprise Supply/Value/ Business Chains," Information Sciences, Aug. 2000, pp. 63-68, vol. 127, Issues 1-2, NH Elsevier.

Web page; "Introduction to Dynamic HTML," at URL=http://msdn2.microsoft.com/en-us/library/ms533044(d=printer).aspx; printed Jul. 17, 2007; 7 pages.

Web page; Bray, T, et al., "Extensible Markup Language (XML) 1.0," Oct. 6, 2000, Second Edition, at URL=http://www.w3.org/TR/2000?REC-xml-20001006 printed Jul. 17, 2007; 58 pages.

"Report of Novelty Search," by Patentec, dated Oct. 16, 2003.

* cited by examiner

ENTERPRISE LINK FOR A SOFTWARE DATABASE

FIELD OF THE INVENTION

The present invention relates generally to information technology in an enterprise, more particularly, to a system and method for acquiring and integrating data from disparate sources in an enterprise and for making the data continuously available, in real-time, to users.

BACKGROUND

A paramount concern in a modern enterprise is the ability to quickly access changing information located on disparate systems and platforms within the enterprise. In order to properly maintain a comprehensive view of the operations and business processes within an organization, however, information on these systems needs to be integrated. For example, as an enterprise grows it requires increased flexibility of data sharing throughout its various automated business systems, such as customer relations management (CRM), enterprise resource planning (ERP), accounting, inventory control, and other systems. A practice known as enterprise application integration (EAI) enables an organization to share data throughout applications and data sources in an organization. EAI may include database linking, application linking, and data warehousing.

Nevertheless, there have been numerous shortcomings in the integration and data sharing in information technology (IT) environments. Independent configuration for disparate technologies and industry standards often make integration requirements difficult to meet. Integrating an existing inventory control system to a new ERP software package, for instance, may be difficult due to the fact that both systems contain unique features that are customized to fit the requirements of particular areas within an organization. Moreover, many EAI solutions contain a confusing web of point-to-point connections between different applications, procedure calls, file transfers, and e-mail-type messaging to transmit organizational data. These solutions are thus high-risk because of their complexity. Moreover, the data within the individual systems is often locked up, sometimes in proprietary form, difficult to access, and not correlated with other systems and platforms. This makes it difficult to get a consistent, coherent view of all the business data across the enterprise.

Yet another major shortcoming of prior EAI systems is that they are unable to source data from anywhere in the enterprise and to provide automated, in-depth analysis of events in the organization that happen as the events occur. Although some business processes are able to function with slow access to information, the availability of access to real-time information regarding the status and operation of business processes can greatly impact the profitability and efficiency of an organization. What is needed is a comprehensive business platform that enables companies to gather, organize, and deliver in real-time the disparate data driving their businesses

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

The present invention provides an enterprise link for a software database. In the following description numerous specific details are set forth, such as the particular configuration of message queues to handle continuous, real-time data acquisition, the architecture of the enterprise link, and the details regarding specific enterprise systems in order to provide a thorough understanding of the present invention. However, persons having ordinary skill in the communication arts will appreciate that these specific details may not be needed to practice the present invention.

Figure 1:
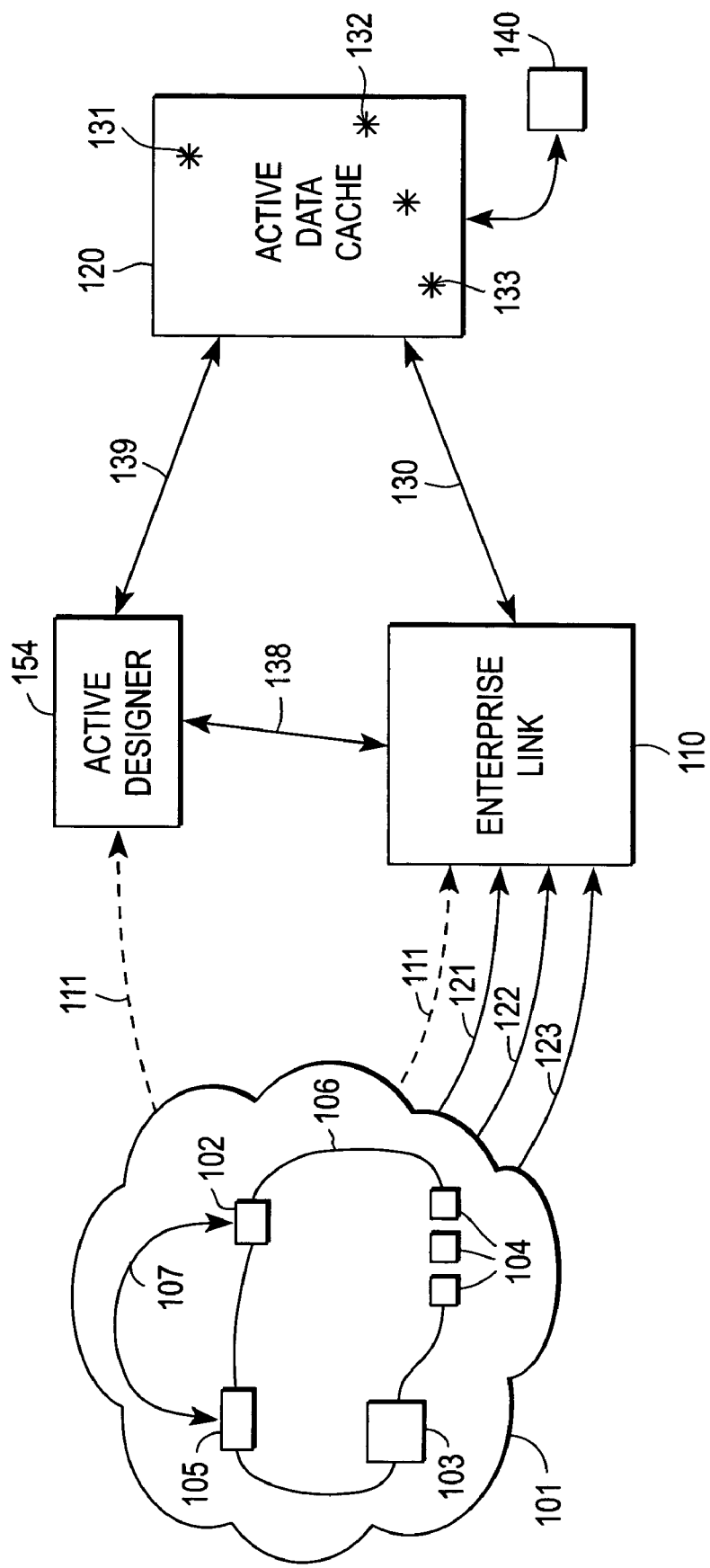
FIG. 1 is a block diagram of an enterprise link connected to existing enterprise systems and to an active data cache according to one embodiment of the present invention.

Referring now to FIG. 1 there is shown a block diagram of an enterprise link connected to existing enterprise systems and to an active data cache according to one embodiment of the present invention. The existing enterprise systems may include legacy systems such as existing hardware and software packages, for example, single-purpose and/or multi-purpose applications designed to perform various functions within an organization (e.g., inventory, finance, accounting, sales force automation, human resources, etc.). There is shown in FIG. 1 a simplistic view of an enterprise computing runtime environment 101 containing a plurality of enterprise systems including packaged software applications such as "back office" applications 102 for enterprise resource planning (ERP), "front-office" applications 103 for customer relationship management (CRM), customized legacy systems 104, and multidimensional/relational database management systems (RDBMS) 105. Of course, a variety of other applications (not shown in this view) may also exist in the enterprise computing runtime environment 101. These disparate systems may be coupled to one another using a local area network (LAN) 106, a wide area network (WAN) or any other such networking environments commonplace in offices, enterprise-wide computer networks, the intranet, and the Internet. Further, network may include a wireless network, such that one or more computers may operate over a wireless LAN.

As is known in the art, the existing enterprise systems contain a variety of different data about the organization. For example, the ERP system 102 may contain data regarding essential business functions including payroll, manufacturing, general ledger, and human resources whereas the CRM system 103 may contain core information regarding the organization's customers. As data in these various systems changes (e.g., a sale is made, a new employee is hired, payroll is processed, etc.), one or more message queueing systems 107 may be used to allow these various applications 102,103, 104, etc., to exchange information on the data being stored in their systems. To this end, one implementation of the present invention employs a message queue server (e.g., the Microsoft RTM message Queue Server (MSMQ) although other message queuing systems may be used as well), to provide loosely-coupled and reliable network (across servers) communication services based on a message-queueing model. In MSMQ, messages are sent to a queue, where the message will stay until it is removed and used by another application. In this manner, loosely-coupled applications can share data to provide an enterprise-wide view of information, such as data and business transactions.

An enterprise link 110 is coupled to the enterprise computing runtime environment 101 through a network connection, such as the Internet 111. Of course, as is noted above, the network connection may also be a LAN, a WAN, a wireless network, or any other system of connections that allows one or more computers to exchange information. The enterprise link 110 integrates, in real-time, the disparate data in the message queues. The enterprise link 110 of the present invention is always active. It continuously accepts raw data feeds 121, 122, 123, etc., from the existing enterprise systems, and then reformats, synchronizes, and consolidates the data. In a traditional model, the data in the message queues would only be processed through the dataflow system when a specified number of records had built up within the message queues (i.e., the data would be transmitted in batch mode). According to an algorithm contained within the data flow system of the present invention, however, individual records are processed through to the enterprise link 110 the moment that they appear (i.e., the program continuously checks for messages). In this manner, real-time data flow is transmitted through the raw data feeds 121, 122, 123 via the message queues. It should be noted that although a message queueing system is used in one embodiment, the enterprise link 100 may also obtain data from the enterprise computing runtime environment 101 in a variety of other ways. These sources of data may be, for example, HyperText Transport Protocol ("HTTP") requests and/or Application Programming Interface ("API") calls and/or Web Services calls. In these alternative embodiments, the enterprise link 110 contains a web server to process the HTTP requests and/or another application or server to process the API and/or Web Service calls.

Regardless of how the enterprise link 110 receives the raw data feeds 121, 122, 123, etc., the enterprise link 110 transmits the data it receives from the enterprise computing runtime environment 101 via a network connection 130 or through some other connection (not shown in this view) to an active data cache (ADC) 120. The ADC 120 is a high-performance, memory-based persistent cache which stores the data 131, 132,133, etc., it receives from the enterprise link 110. The ADC 120 contains code which may be implemented in software such as Java™, Perl, C++, or other types of programming languages that can be stored on a computer-readable medium (e.g., a disk) to manage the data 131, 132,133, etc., that is actively changing within the enterprise computing runtime environment 101 and to make the data accessible to the end-user (not shown in this view) in real-time. In this manner, the data 131, 132, 133, etc., in the ADC 120 is constantly changing in that it is synchronized in real-time with the data in the enterprise runtime computing environment 101. The data 131, 132, 133, etc., in the ADC 120 is persistent to disk 140, but this disk 140 is only used for backup, restore, and recovery purposes.

An active designer 154 is the component of the enterprise link 110 that determines what data will be contained within the ADC 120 and also the process by which the data 131, 132, 133, etc., will be transmitted to the ADC 120. As is shown in FIG. 1, the active designer 154 is also connected to the enterprise computing runtime environment 101 via the Internet 111. Active designer is also shown coupled with ADC 120 via a network connection 139. In essence, the active designer 154 contains one or more lists of data flow definitions (not shown in this view) on how to operate on the data that is transmitted to the active designer 154 through the network connection 111. Again, the code for the data flow definitions may be implemented in software such as JAVA, Perl, C++, C#, or other types of programming languages that can be stored on a computer-readable medium. For example, when sales data arrives at the ERP 102, the active designer 154 contains a set of data flow definitions on how to retrieve, transform, and display this data (i.e., each data flow definition includes executable software code instructing the enterprise link 110 to retrieve the salesperson field whenever a sale is made, to describe how many sales that salesperson has made for the day, and then to transmit this data to the ADC 120). This mapping process (i.e., the process by which the enterprise link 110 is able to express data from multiple sources through various transformations and to transmit the transformed data to specified destinations) will be described in more detail in reference to FIG. 2A.

Figure 2A:
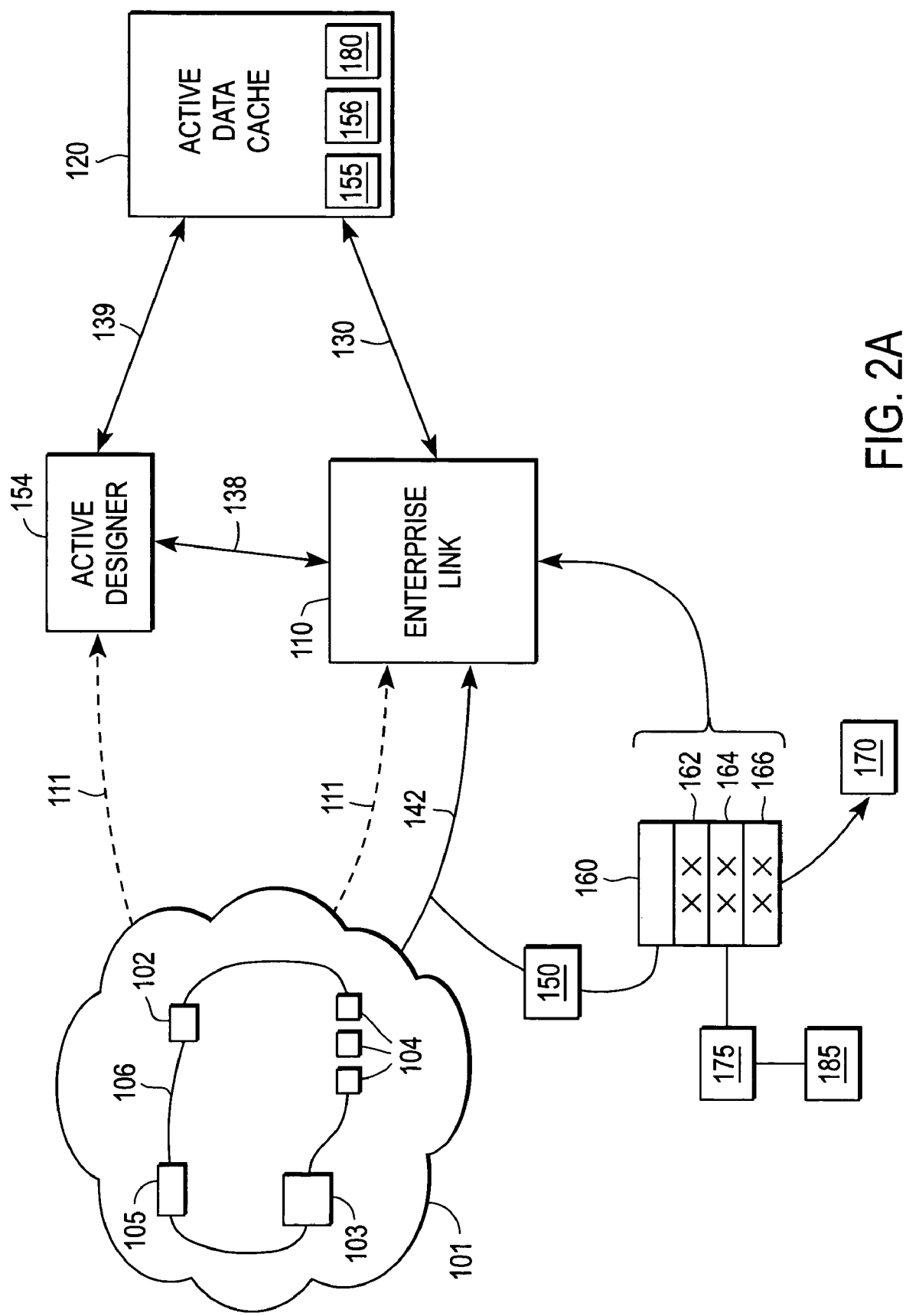
FIG. 2A is a block diagram of message queue processing using the enterprise link of FIG. 1.
Figure 2B:
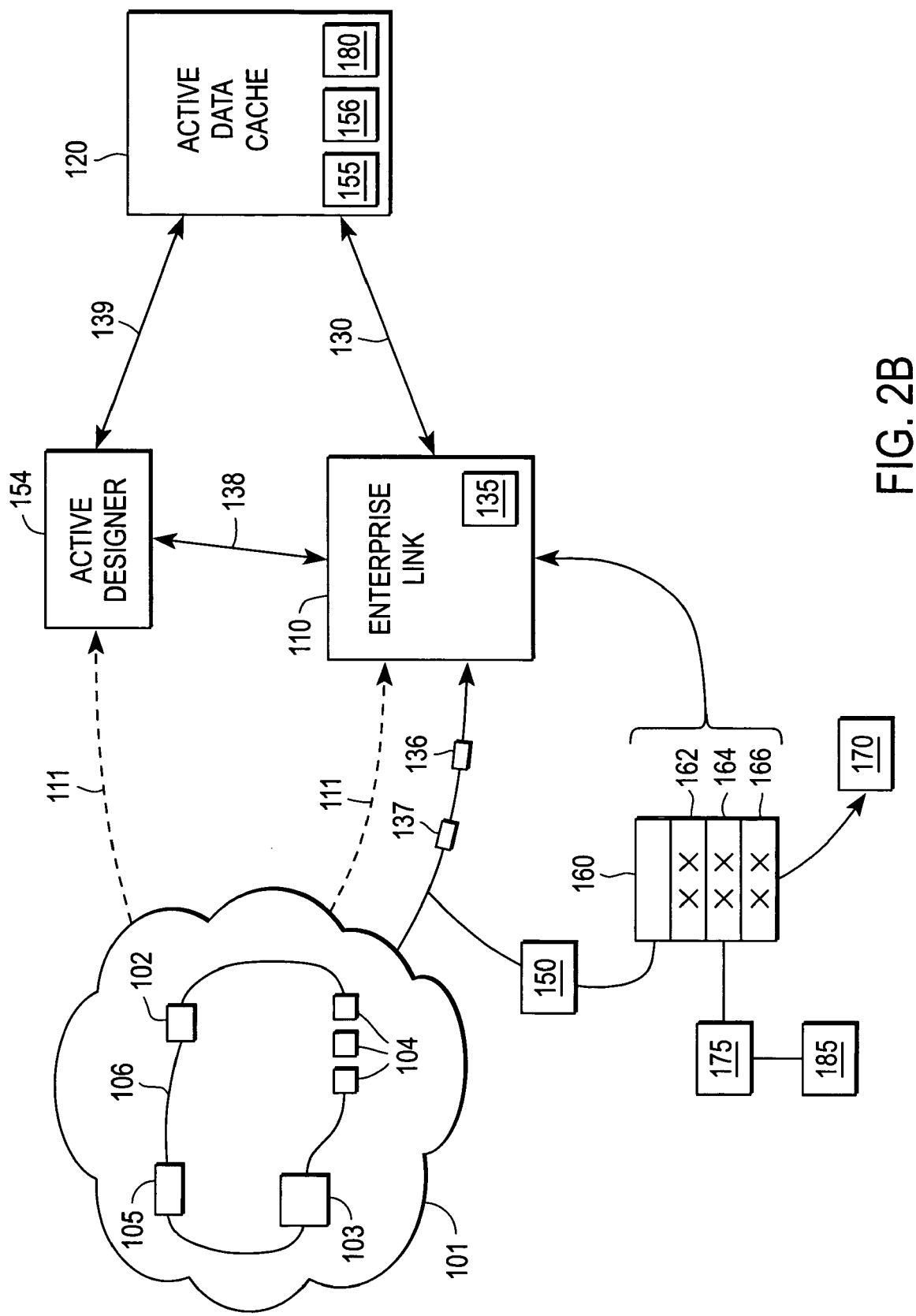
FIG. 2B is a block diagram of a HTTP and API data request processing using the enterprise link of FIG. 1.

Referring now to FIG. 2A there is shown a block diagram of message queue processing system using the enterprise link of FIG. 1. As is noted above, a variety of message queuing systems may be used in practicing the present invention (e.g., Microsoft RTM Message Queue Server). As data changes in the plurality of enterprise systems in the enterprise computing runtime environment 101, the data is sent to the enterprise link 110 in data feeds through message queues 142. The data that comes through the message queues 142 may come from disparate sources (i.e., the ERP system 102, the CRM 103, customized legacy systems 104, etc.). The active designer 154 divides the data into transaction channels 155 (i.e., the method by which the data arrives) and transaction formats 156 (i.e., the method by which the data is interpreted). In the embodiment illustrated by FIG. 2A, Extensible Markup Language (XML) is used to specify the format of the records (as well as the values to be used in those records). It should be noted, however, that other types of data formats may be used as well. The data is then interpreted as logical instances of transaction sources 150 and transmitted to a data flow service 160. The data flow service 160 is part of the enterprise link 110. As is noted above, the data may also be transmitted to the enterprise link through HTTP requests and/or API calls and/or Web Services. FIG. 2B illustrates a web server 135 in the enterprise link 110 receiving data through HTTP requests 136 and API calls 137.

According to the embodiment illustrated by FIG. 2A, the data flow service 160 contains a plurality of data flow plans 162, 164,166, as well as a data repository 170 which contains one or more lists of data flow definitions on how to operate on the data. As is described above, the active designer 154 creates the lists of data flow definitions which are stored in the data repository 170. However, it is the data flow service 160 that actually executes or edits the data flow plans 162, 164, 166, etc., when it is time to do so. One exemplary data flow service that can be utilized is the one described in U.S. Pat. No. 6,243,698 entitled "Extensible Database Retrieval and Viewing Architecture," which is incorporated herein by reference. Of course, other types of data flow services may be used as well. The data flow plans 162, 164, 166, etc., include executable code for accessing, manipulating, and/or outputting data received from the enterprise computing runtime environment 101. A plan monitoring service 175 is connected to the data flow service 160. The plan monitoring service 175 examines all the data flow plan links to datasets 180 that are defined in the ADC 120 and causes the data flow service 160 to run the plans associated with each dataset. The plan monitoring service 175 also includes a user interface 185 to monitor the data flow service 160 to ensure that all of the data flow plans 162, 164, 166, etc., are being executed properly. In one embodiment, the user interface 185 allows the data flow plans 162,164,166, etc., to be extensible. That is, through the user interface 185 new steps can be defined without having to change the application to support the new steps. The user interface 185 can thus extend the application (i.e., create a new set of transaction channels and transaction formats) without having to recompile the enterprise runtime computing environment 101. The enterprise link 110 is also able to replicate existing metadata in the enterprise runtime computing environment 101 by importing datasets definitions from the existing enterprise systems into the active designer 154 through network link 138. In this manner, whenever an enterprise link 110 is installed in an organization, an entirely new set of metadata conforming to the existing enterprise systems within the organization does not need to be defined by the active designer 154.

Figure 3:
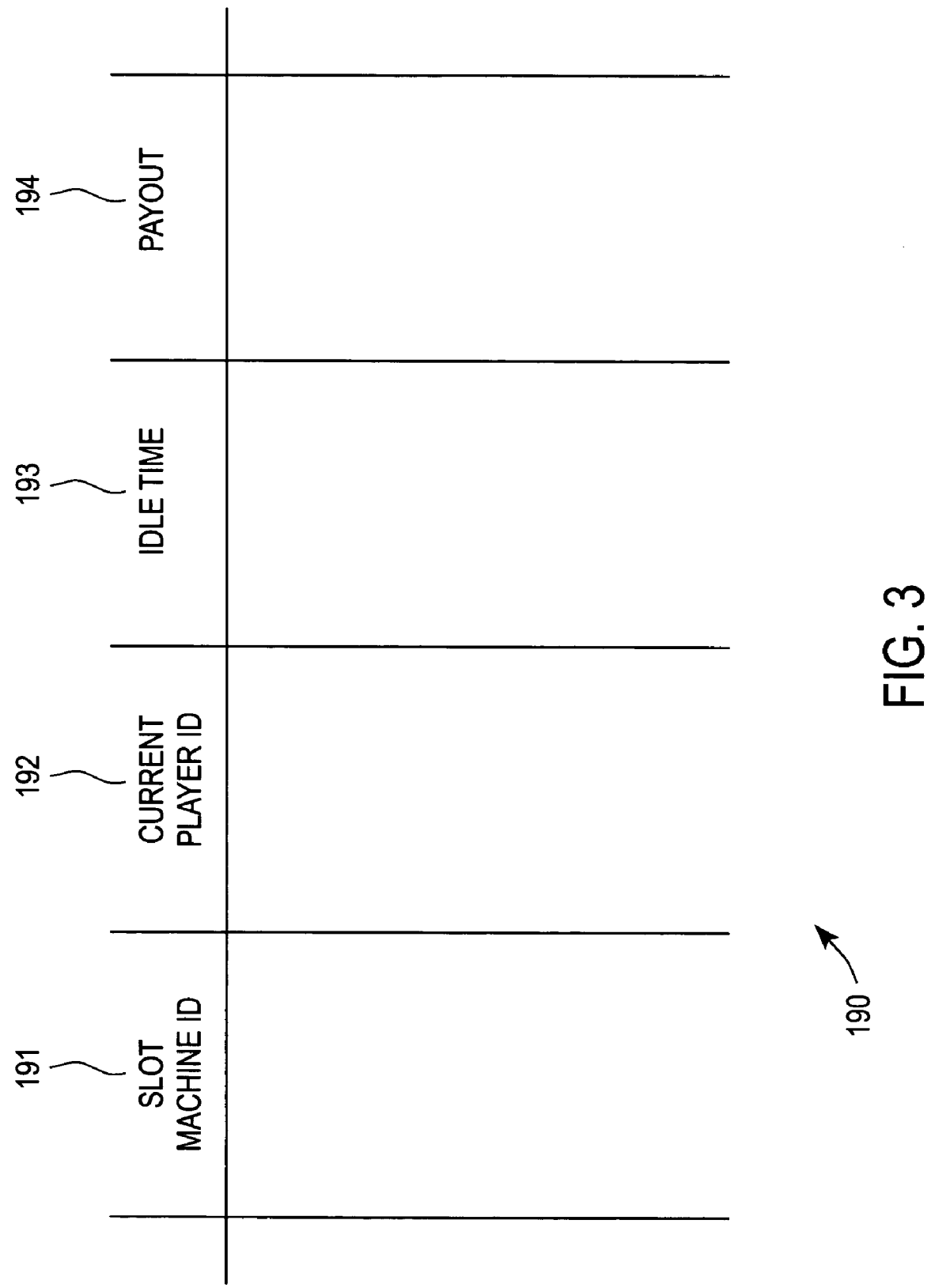
FIG. 3 is an example of data stored in tabular form in an active data cache according to one embodiment of the present invention.

FIG. 3 is an example of data stored in a data set in tabular form in an active data cache according to one embodiment of the present invention. In the embodiment illustrated by FIG. 3, the enterprise link is used to monitor the state of a casino business in real-time. For example, all of the gaming devices (e.g., slot-type machines, video-poker machines, lottery machines, etc.) in a particular casino may be connected to a database server (e.g., such as an Oracle™ server) using a communication interface associated with each gaming device. The tabular form 190 contains a variety of data entry fields and associated labels. There is a data entry field for the slot-type machine identification 191, for the identification of the current player operating the slot machine 192 (e.g., as identified by a player card inserted in the slot machine), for the amount of time the slot machine is idle 193, and for the payout over time 194. Every time data changes (e.g., every time a particular player uses an identified machine), the data generated by the machine is recorded into the database. This data is transmitted by the database server to the enterprise link over a network through a message queueing system. Alternatively, the data generated by the slot machine could be sent directly to the message queueing system through some intermediate application monitoring the machine, bypassing the data base recording step. Using the enterprise link in the manner described herein, the data is then manipulated by the data flow service according to the executing data flow plans that were created by the active designer (See FIG. 2A). This manipulated data is then transmitted via a network connection to the ADC where it is stored and made accessible to the end-user. This data may be accessed by the end-user from anywhere across the enterprise (or even across the globe, if necessary, using an Internet connection). In this manner, the data may be used for real-time decision making to give the business a competitive edge (e.g., by providing the end-users with the ability to monitor the gaming habits of specific players).

Of course, although data stored in tabular form for a casino business is shown in FIG. 3, it should be noted that the tabular form of the present invention may contain a variety of different data entry fields to keep an end-user appraised in real-time about the events occurring anywhere across the enterprise in the course of conducting the business of the enterprise. For example, a chemical plant could specify database entry fields tailored to monitor dangerous changes within the chemical plant. In a second example, health care providers could specify database fields for a patient's medical history, diagnosis, and drug treatment plans. In yet another example, retail organizations could specify database fields for product sales and increases and decreases in inventory. In all of these examples, access to real-time recognition of business events in the database format would lead to heightened profitability and give the business a competitive edge.

Figure 4:
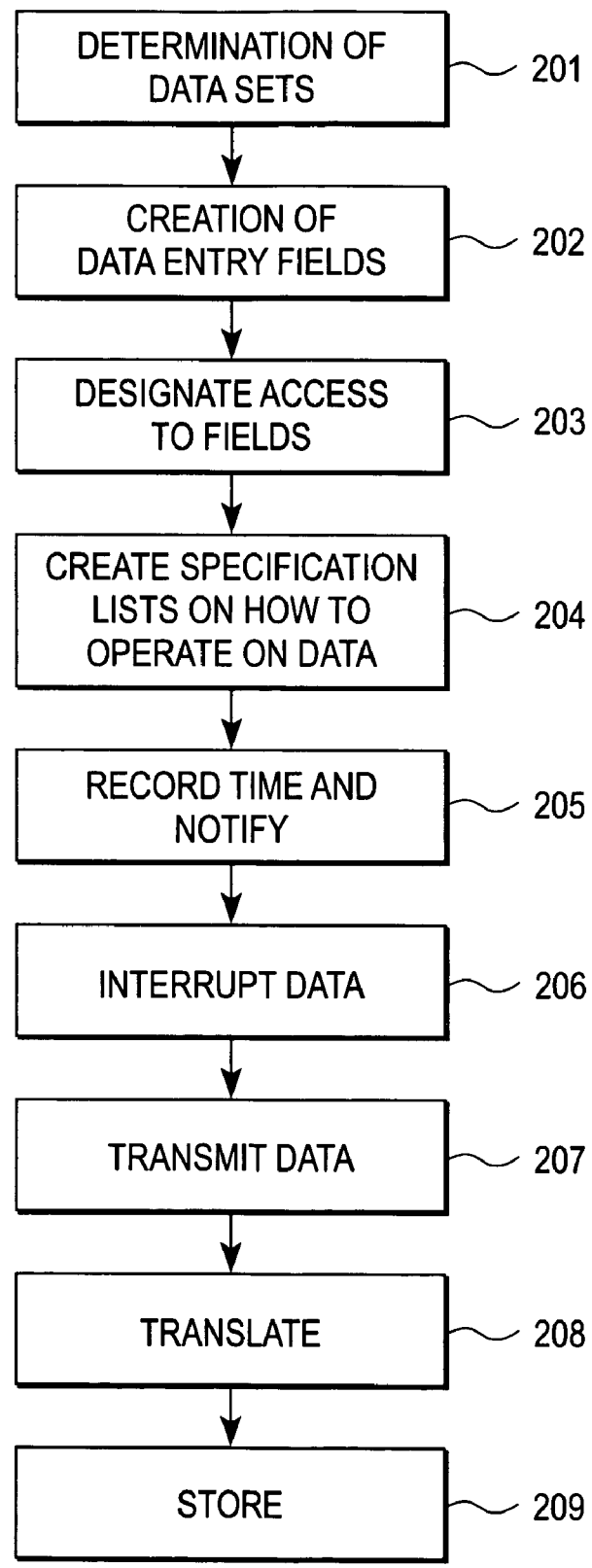
FIG. 4 is a flow chart illustrating the steps of an active design process using an active designer according to one embodiment of the present invention.

FIG. 4 is a flow chart illustrating the steps of an active design process using an active designer according to one embodiment of the present invention. In operation, the active designer is essentially a user-interface that allows an organization to customize the data stored in the ADC (i.e., to create data sets along with one or more lists of data flow definitions associated with each data set that specify how to operate on the data that is transmitted to the ADC in real-time via the enterprise link). A user determines what datasets need to be stored in the datasets in the ADC (processing block 201). This process involves both a creation of the data entry fields that are to be included in the datasets (processing block 202) and designating who should have access to these fields (processing block 203). The user then creates one or more lists of data flow definitions on how to operate on the data in response to messages arriving on the message queues (or HTTP or API calls or Web Services) (processing block 204) (e.g., keep a record of every order, of the person who made the order, of the time the order occurred, and then notify every salesperson in the organization about the order)(processing block 205). In operation, the data in an enterprise runtime computing environment is then interpreted as logical instances of transaction sources (processing block 206) and is transmitted to a data flow service in the enterprise link in real time (processing block 207) where it is translated (processing block 208) and used to create and/or update one or more data sets in the ADC (i.e., made available to end-users) (processing block 209).

Figure 5:
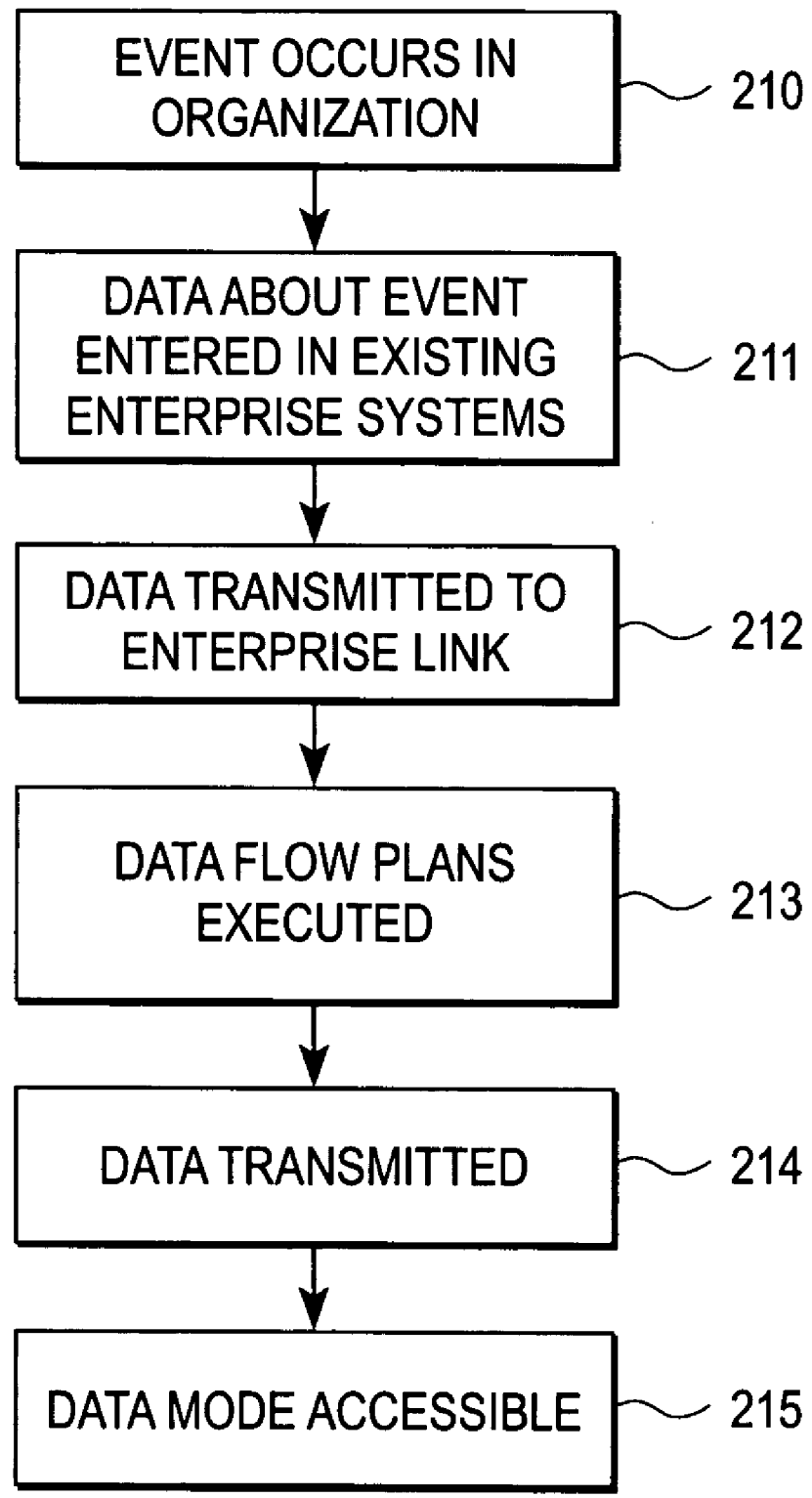
FIG. 5 is a flow chart illustrating the steps of utilizing an enterprise link system to obtain real-time data from disparate systems in an organization according to one embodiment of the present invention.

Referring now to FIG. 5 there is shown a flow chart illustrating the steps of utilizing an enterprise link system to obtain real-time data from disparate systems in an organization according to one embodiment of the present invention. An event occurs in an enterprise system within an organization (processing block 210). Data about the event is entered into an existing enterprise system within the organization (e.g., a CRM system) (processing block 211). The data is transmitted over the Internet to an enterprise link through the message queuing system (processing block 212). A data flow service in the enterprise link executes one or more data flow plans to operate on the data that is transmitted by the existing enterprise systems (processing block 213). The data is transmitted to an ADC (processing block 214) where it is made accessible to an end-user (processing block 215).

Figure 6:
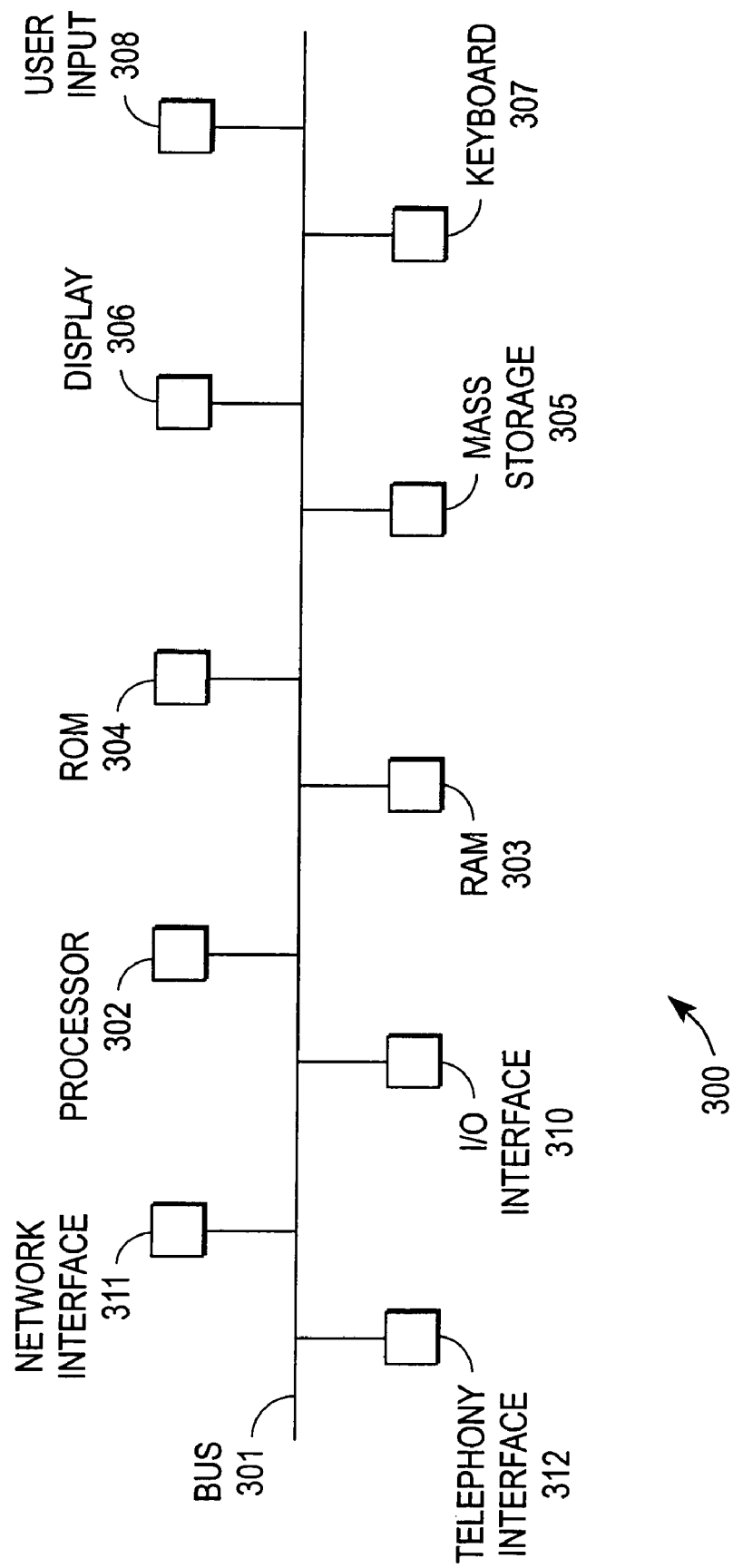
FIG. 6 is an example of a computer system on which the present techniques may be implemented.

Referring now to FIG. 6 there is shown an example of a computer system on which the present techniques may be implemented according to one embodiment of the present invention. The computer system 300 includes a processor 302 coupled through a bus 301 to a random access memory (RAM) 303, a read only memory (ROM) 304, and a mass storage device 305. Mass storage device 305 could be a disk or tape drive for storing data and instructions. A display device 306 for providing visual output is also coupled to processor 302 through bus 301. Keyboard 307 is coupled to bus 301 for communicating information and command selections to processor 302. Another type of user input device is cursor control unit 308, which may be a device such as a mouse or trackball, for communicating direction commands that control cursor movement on display 309. Many other input devices well known in the art may also be used. Further coupled to processor 302 through bus 301 is an input/output (I/O) interface 310 which can be used to control and transfer data to electronic devices connected to computer 300, such as other computers, tape records, and the like. The processor 302 may also be connected to a telephony interface 312 through bus 301. It should be noted that although display device 306, keyboard 307, and cursor control unit 308 may be included in the computer system 300, they are typically not essential for the computer system 300 to operate after the software has been installed.

Network interface device 311 is coupled to bus 301 and provides a physical and logical connection between computer system 300 and the network medium (not shown in this view). Depending on the network environment in which computer 300 is used, this connection is typically to a server computer, but it can also be to a network router to another client computer. Note that the architecture of FIG. 3 is provided only for purposes of illustration, and a client computer used in conjunction with the present invention is not limited to this specific architecture.

In the foregoing, an enterprise link for a software database has been described. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed:

1. A system, comprising:
   at least two enterprise applications installed in sites across an organization;
   an enterprise link coupled to the at least two enterprise applications over a network, the enterprise link configured for real-time integration of disparate data from the at least two enterprise applications, the enterprise link continuously accepting data feeds from the at least two enterprise applications, and reformatting, synchronizing, and consolidating the disparate data;
   a data flow service coupled to the at least two enterprise applications and the enterprise link, the data flow service containing data flow plans for processing the disparate data received from the at least two enterprise applications through to the enterprise link in real-time, as soon as the data appears; and
   a data cache coupled to receive and store the reformatted, synchronized, and consolidated data from the enterprise link, wherein changes to the data in the data cache occur at a rate substantially matched with real-time data changes occurring in the at least two enterprise applications.

2. The system of claim 1 further comprising a message queuing system to enable the at least two enterprise applications to exchange data.

3. The system of claim 2 wherein the message queueing system comprises a message queue server, the at least two enterprise applications being coupled to the message queue server over the network.

4. The system of claim 3 wherein the enterprise link is configured to continuously accept data from the message queue server.

5. The system of claim 1 wherein the data is transmitted through the network to the enterprise link from the at least two enterprise applications in real-time via Hypertext Transport Protocol (HTTP) requests.

6. The system of claim 1 wherein the data is transmitted through the network to the enterprise link from the at least two enterprise applications in real-time via Application Programming Interface (API) calls.

7. The system of claim 1 wherein the data is transmitted through the network to the enterprise link from the at least two enterprise applications in real-time via Web Service calls.

8. The system of claim 1 further comprising a designer component to create one or more lists of data flow plans, the data flow plans determining how to operate on the data received by the enterprise link.

9. The system of claim 8 further comprising a message queueing system to enable the at least two enterprise applications to exchange information.

10. The system of claim 9 wherein the message queueing system comprises a message queue server, the at least two enterprise applications being coupled to the message queue server over the network.

11. The system of claim 1 wherein the enterprise link is further operable to replicate existing metadata in the at least two enterprise applications.

12. A method comprising:
    transmitting data from an enterprise computing runtime environment that includes at least two enterprise applications to an enterprise link, the data being transmitted through to the enterprise link via a network connection as soon as the data appears in the enterprise computing runtime environment;
    integrating the data by the enterprise link immediately upon receiving the data from the enterprise computing runtime environment, the integrating including transforming the data in accordance with a set of data flow definitions that specify operations to be performed on the data;
    transmitting the integrated data to an active data cache that stores the integrated data, wherein data changes occur in the active data cache at a rate synchronous with real-time data changes occurring in the enterprise computing runtime environment; and
    making the integrated data stored in the active data cache accessible to an end-user via a user interface at the rate.

13. The method of claim 12 wherein the transforming comprises reformatting the data so as to be compatible with a specific format.

14. The method of claim 12 wherein the transforming comprises synchronizing the data.

15. The method of claim 12 wherein the data is transmitted from the enterprise computing runtime environment to the enterprise link utilizing a message queueing system.

16. The method of claim 12 wherein the data is transmitted from the enterprise computing runtime environment to the enterprise link via Hypertext Transport Protocol (HTTP) requests.

17. The method of claim 12 wherein the data is transmitted from the enterprise computing runtime environment to the enterprise link via Application Programming Interface (API) calls.

18. The method of claim 12 wherein the data is transmitted from the enterprise computing runtime environment to the enterprise link via Web Service calls.

19. A method comprising:
    transmitting data generated responsive to an event occurring in an enterprise system of an organization to an enterprise link through a message queuing system as soon as the data is generated, the enterprise system including at least two enterprise applications;

transforming the data by a data flow service in the enterprise link in accordance with a set of data flow plans that specify one or more data operations, the transforming commencing immediately upon receiving the data from the enterprise system, the transforming producing one or more data sets;

transmitting the one or more data sets to a data cache as soon as the one or more data sets are produced in the enterprise link;

storing the one or more data sets in the data cache, data changes occurring in the data cache at a rate that substantially matches real-time data generation in the enterprise system;

providing user accessibility to the data stored in the data cache as the data changes in real-time in the data cache.

* * * * *

UNITED STATES PATENT AND TRADEMARK OFFICE
CERTIFICATE OF CORRECTION

| | |
|---|---|
| PATENT NO. | : 7,454,423 B2 |
| APPLICATION NO. | : 10/237559 |
| DATED | : November 18, 2008 |
| INVENTOR(S) | : Powers et al. |

It is certified that error appears in the above-identified patent and that said Letters Patent is hereby corrected as shown below:

In column 1, line 59, after "businesses" insert -- . --.

Signed and Sealed this

Twenty-seventh Day of April, 2010

David J. Kappos
*Director of the United States Patent and Trademark Office*